(12) United States Patent
Gerrese et al.

(10) Patent No.: US 11,907,355 B2
(45) Date of Patent: Feb. 20, 2024

(54) CHILD-FRIENDLY AUTHENTICATION

(71) Applicant: GM Cruise Holdings LLC, San Francisco, CA (US)

(72) Inventors: Alexander Willem Gerrese, San Francisco, CA (US); Ajay Alfred, San Francisco, CA (US); Aakanksha Mirdha, San Francisco, CA (US); Jeremy Stephen Juel, San Francisco, CA (US); Grace Noh, San Francisco, CA (US); Swarnakshi Kapil, Sunnyvale, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 378 days.

(21) Appl. No.: 17/487,428

(22) Filed: Sep. 28, 2021

(65) Prior Publication Data

US 2023/0100629 A1     Mar. 30, 2023

(51) Int. Cl.
*G06F 21/36* (2013.01)
*G06Q 50/30* (2012.01)

(52) U.S. Cl.
CPC ............. *G06F 21/36* (2013.01); *G06Q 50/30* (2013.01); *G06F 2221/2129* (2013.01); *G06F 2221/2145* (2013.01)

(58) Field of Classification Search
CPC ........................................ G06F 21/36
See application file for complete search history.

(56) References Cited

U.S. PATENT DOCUMENTS

| | | | |
|---|---|---|---|
| 10,640,082 B1 | 5/2020 | Shannon et al. | |
| 11,449,808 B2 * | 9/2022 | Hara | G01C 21/3438 |
| 2018/0141562 A1 * | 5/2018 | Singhal | A61B 5/165 |
| 2018/0202822 A1 * | 7/2018 | DeLizio | G01C 21/3438 |
| 2021/0406893 A1 * | 12/2021 | Calvert | G06Q 20/204 |

* cited by examiner

*Primary Examiner* — Bradley W Holder
(74) *Attorney, Agent, or Firm* — Akona IP PC

(57) ABSTRACT

Systems and methods are provided for child-friendly authentication for autonomous vehicle rides. In particular, systems and methods are provided for offering alternative authentication methods that automatically engage child-friendly features. The systems and methods provided enable unsupervised children to take advantage of autonomous rideshare and delivery programs using child-friendly authentication methods. Additionally, augmented autonomous vehicle safety and security practices for children are provided.

20 Claims, 10 Drawing Sheets

CHILD-FRIENDLY AUTHENTICATION

FIELD OF THE DISCLOSURE

The present disclosure relates generally to autonomous vehicles (AVs) and to systems and methods for child-friendly authentication.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles are often used to provide rides to passengers who remotely request a vehicle for a selected pick up location and destination. Some passenger trip requests include children, and sometimes children can ride in autonomous vehicles alone. In conventional approaches, the autonomous vehicle may use substantially similar operating procedures regardless of whether the passenger is an adult or a child.

SUMMARY

Systems and methods are provided for offering alternative authentication methods that automatically engage child-friendly features. In particular, systems and methods are provided for empowering unsupervised children to take advantage of autonomous rideshare and delivery programs using child-friendly authentication methods. Additionally, augmented autonomous vehicle safety and security practices for children are provided.

According to one aspect, a method for child friendly authentication in an autonomous vehicle is provided, comprising receiving a ride request including a pick-up location from a primary user account; receiving a non-alphanumeric authentication code from the primary user account; transmitting the ride request including the authentication code to the autonomous vehicle; presenting, at the pick-up location, an authentication interface configured to receive an authentication input; comparing the authentication input with the authentication code.

In some implementations, the primary user account includes a child sub-account and wherein receiving the non-alphanumeric authentication code includes associating the non-alphanumeric authentication code with the child sub-account. In some implementations, the method further includes determining the ride request is associated with the child sub-account based on the authentication input. In some implementations, the method further includes entering the autonomous vehicle into a child mode based on child sub-account settings. In some implementations, the method further includes, when the authentication input and the authentication code do not match, contacting a primary user account mobile device.

In some implementations, the method further includes receiving the authentication input from one of a mobile device and an autonomous vehicle touchscreen. In some implementations, the authentication code includes at least one of the following: an emoji, a bitmoji, a memoji, an animated character, a building block arrangement, a knocking pattern, a drawing, and a story frame sequence. In some implementations, the method further includes, when the authentication input and the authentication code do not match, contacting a live remote assistant.

According to another aspect, a system for child friendly authentication an autonomous vehicle is provided, comprising: a central computing system configured to: receive a ride request from a primary user account including a pick-up location, wherein the primary user account includes a non-alphanumeric authentication code; select an autonomous vehicle to fulfill the ride request; and transmit the ride request and the non-alphanumeric authentication code to the autonomous vehicle; an authentication interface on the autonomous vehicle configured to receive an authentication input; and an onboard computing system on the autonomous vehicle configured to: direct the autonomous vehicle to the pick-up location; present the authentication interface; compare the authentication input with the authentication code; and based on the comparison, unlock an autonomous vehicle door.

In some implementations, the primary user account includes a child sub-account and wherein the non-alphanumeric authentication code is associated with the child sub-account. In some implementations, the onboard computing system is further configured to determine the ride request is associated with the child sub-account based on the authentication input. In some implementations, the onboard computing system is further configured to enter the autonomous vehicle into a child mode based on child sub-account settings. In some implementations, when the authentication input and the authentication code do not match, the onboard computing system is further configured to contact a primary user account mobile device. In some implementations, the authentication code includes at least one of the following: an emoji, a bitmoji, a memoji, an animated character, a building block arrangement, a knocking pattern, a drawing, and a story frame sequence. In some implementations, the onboard computing system is further configured to determine the ride request is associated with a child sub-account and the authentication interface provides a selection of input characters corresponding with an authentication code type.

According to another aspect, an autonomous vehicle for providing child friendly authentication is provided, comprising: an authentication interface configured to receive a non-alphanumeric authentication input; and an onboard computing system configured to: receive ride request information including a pick-up location and a non-alphanumeric authentication code, wherein the ride request information is associated with a primary user account, and wherein the primary user account includes a child sub-account and the non-alphanumeric authentication code is associated with the child sub-account; direct the autonomous vehicle to the pick-up location; present the authentication interface; compare the authentication input with the authentication code; and based on the comparison, unlock an autonomous vehicle door.

In some implementations, the onboard computing system is further configured to determine the ride request is associated with the child sub-account based on the authentication input. In some implementations, the onboard computing system is further configured to enter the autonomous vehicle into a child mode based on child sub-account settings. In some implementations, the onboard computing system is further configured to determine the ride request is associated with a child sub-account and the authentication interface provides a selection of input characters corresponding with an authentication code type. In some implementations, the authentication code includes at least one of the following: an emoji, a bitmoji, a memoji, an animated character, a building block arrangement, a knocking pattern, a drawing, and a story frame sequence.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Systems and methods are provided for child-friendly authentication methods for autonomous vehicles. In particular, alternative authentication methods are provided that automatically engage child-friendly features and augments safety and security practices. The systems and methods provided can empower unsupervised children to take advantage of autonomous vehicle rideshare and delivery programs.

Autonomous vehicles unlock new possibilities for families, enabling unsupervised transit for young children as well as others who have previously been underserved, without the worry of a potentially unpredictable or untrustworthy human driver. With accurate location tracking, connected in-car cameras and microphones, a safer driving record than any human, and world-class security, autonomous vehicles will soon become the ubiquitous choice for school commutes, playdates, field trips, and more.

However, to ensure that autonomous vehicle transportation maintains a superior level of safety from end to end, authentication procedures that are child-friendly are needed. In general, child-friendly authentication methods are easily remembered, not reliant on numerical strings, and unique to each child. Since this generation's children are extremely tech savvy, often learning to use tablets and smartphones before learning to read, guardians can work with children to set up non-alphanumerical passcodes. The non-alphanumerical passcodes are generally more creative and visually-based, but just as secure as alphanumerical codes.

Example Autonomous Vehicle Configured for Child-Friendly Authentication

Figure 1:
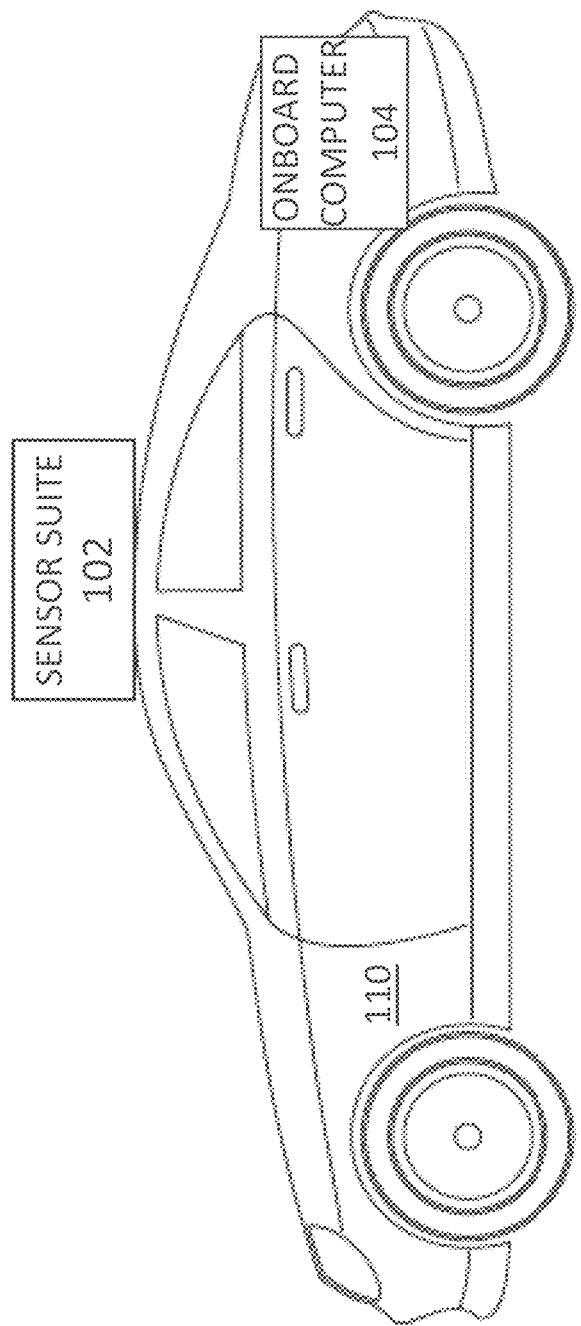
FIG. 1 is a diagram illustrating an autonomous vehicle, according to some embodiments of the disclosure.

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, and to sense and avoid obstacles. According to various implementations, the autonomous vehicle 110 is part of a fleet of vehicles for picking up passengers and/or packages and driving to selected destinations. The autonomous vehicle 110 is configured to provide child-friendly authentication methods so that children can unlock the autonomous vehicle.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events, and update a high fidelity map. In particular, data from the sensor suite can be used to update a map with information used to develop layers with waypoints identifying selected events, the locations of the encountered events, and the frequency with which the events are encountered at the identified location. In some examples, the presence and location of open parking spaces is detected and this information is recorded in a mapping system. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passenger belongings left inside the vehicle. Based upon the vehicle state and programmed instructions, the onboard computer 104 controls and/or modifies driving behavior of the autonomous vehicle 110. In some examples, the onboard computer 104 receives and processes data from a child-friendly authentication interface on the autonomous vehicle 110. Based on data from the authentication interface, the onboard computer 104 can unlock a vehicle door allowing a passenger inside the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles. In some examples, the onboard computer 104 receives data from sensors inside the vehicle and uses sensor data to provide supervision of vehicle occupants.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Method for Autonomous Vehicle Child-Friendly Authentication

Figure 2A:
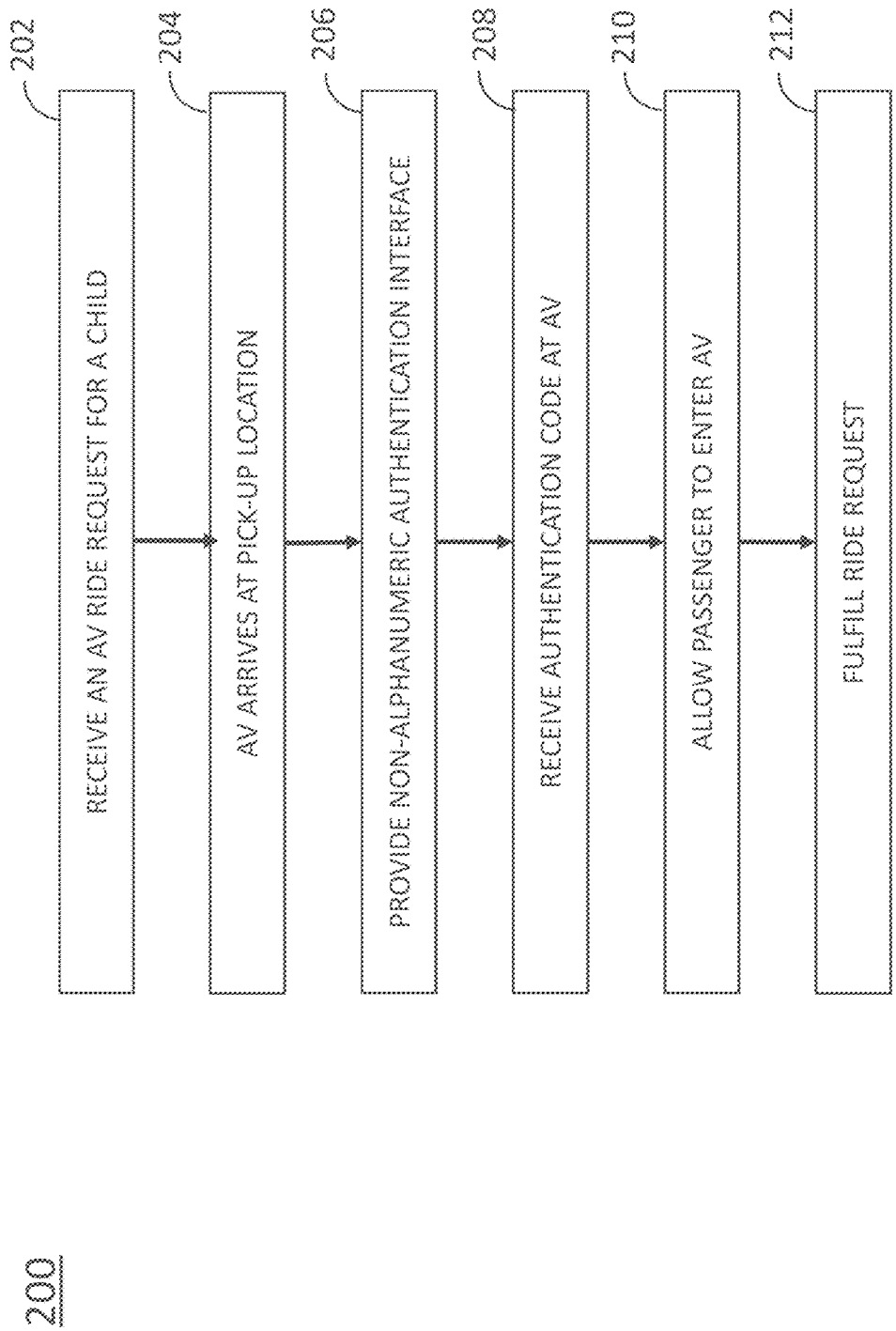
FIGS. 2A-2B are diagrams illustrating methods for child-friendly authentication, according to some embodiments of the disclosure.
Figure 2B:
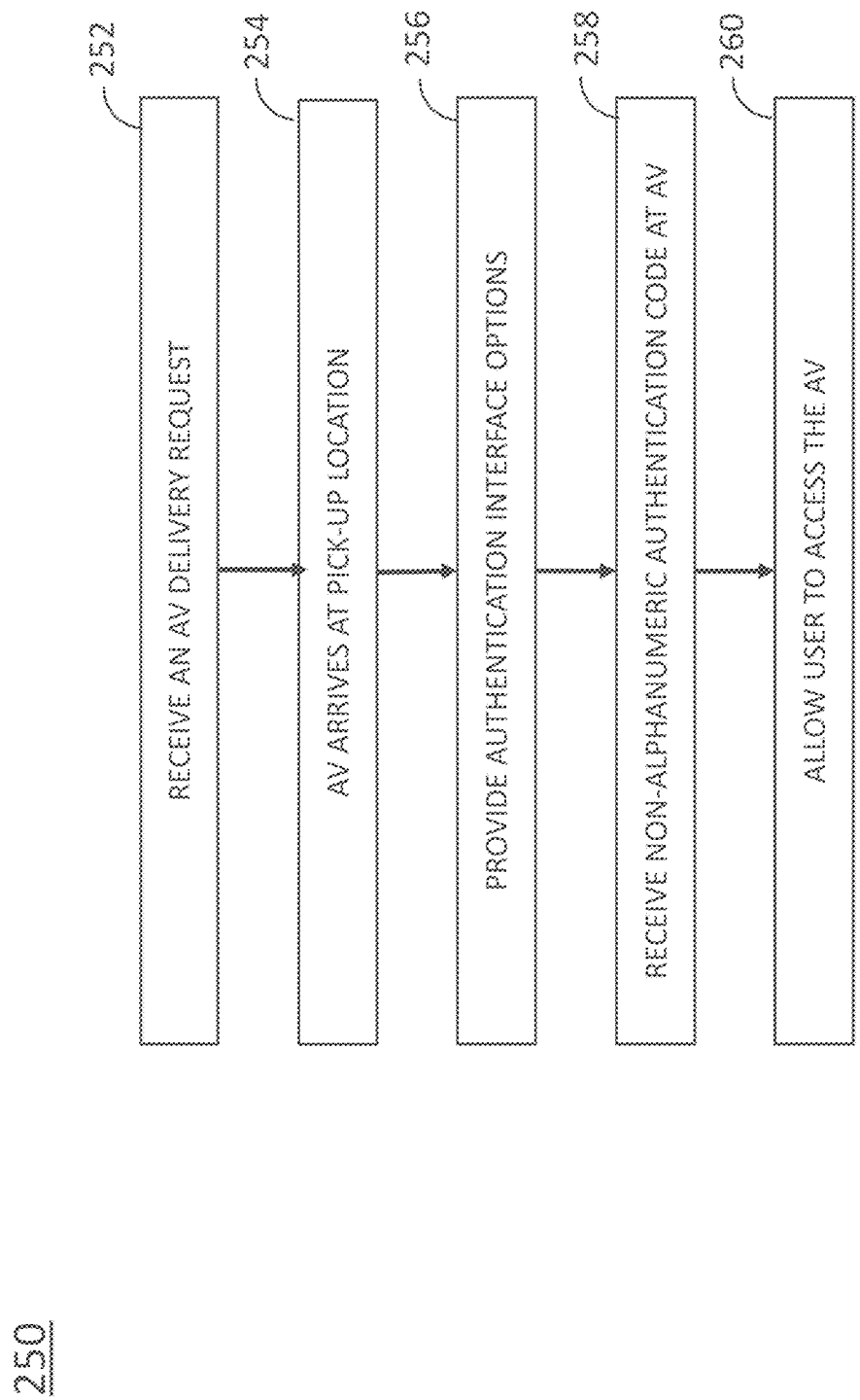

FIGS. 2A-2B are diagrams illustrating methods 200, 250 for autonomous vehicle child-friendly authentication, according to various embodiments of the invention. In particular, FIG. 2A is a diagram illustrating a method 200 for autonomous vehicle child-friendly authentication for a ride, according to various embodiments of the invention. At step 202, an autonomous vehicle ride request for a child is received. The ride request is associated with a user account (e.g., a guardian account), and includes a pick-up location and a destination location. In various examples, the ride request includes a child passenger identification. In some examples, information about the child passenger is collected, such as the passenger age. In some examples, the user account includes a sub-account for the child passenger, and information about the child and vehicle settings for the child are saved in the child sub-account. In various examples, the child has a mobile device with the autonomous vehicle rideshare application installed, and the child sub-account is accessible on the child's mobile device. In various implementations, as discussed with respect to FIG. 2B, instead of a ride request, an autonomous vehicle delivery and/or pick-up request is received, and a child will access the autonomous vehicle to submit the delivery or pick up the delivered item.

At step 204, an autonomous vehicle arrives at the pick-up location for the child. At step 206, a child-friendly authentication interface is provided on the vehicle, on which the child can enter a pre-determined passcode. In various examples, the child-friendly authentication interface is a non-alphanumeric authentication interface. As discussed in greater detail with respect to FIGS. 4A-4D, various non-alphanumeric authentication methods include emoji passcodes, building block arrangements, knocking sequences, complete-the-story codes, drawing recognition codes, favorite animated character selection, and bitmoji selection.

At step 208, an authentication code is received at the autonomous vehicle. In particular, a non-alphanumeric authentication code input through the child-friendly authentication interface is received. The received authentication code is compared to an authentication code selected in the user rideshare settings for the child sub-account, and, if the received authentication code matches the code in the child sub-account settings, at step 210, a vehicle door is unlocked, allowing the passenger to enter the vehicle. In some examples, other verification methods are simultaneously enabled, such as receiving a unique identification signal from a child mobile device rideshare application. At step 212, the autonomous vehicle drives the child passenger to the destination location, fulfilling the ride request.

FIG. 2B is a diagram illustrating a method 250 for autonomous vehicle child-friendly authentication for deliveries, according to various embodiments of the invention. At step 252, an autonomous vehicle delivery and/or pick-up request is received. The delivery request is associated with a user account (e.g., a guardian account), and includes a delivery and/or pick-up location. In some examples, the user account includes a sub-account for a child passenger, and information about the child and vehicle settings for the child (such as a child-friendly authentication code) are saved in the child sub-account. The delivery and/or pick-up request can be received from either the primary user account or the child sub-account. In various examples, the child has a mobile device with the autonomous vehicle rideshare application installed, and the child sub-account is accessible on the child's mobile device.

At step 254, an autonomous vehicle arrives at the delivery and/or pick-up location. In various implementations, when the autonomous vehicle arrives at the delivery and/or pick-up location, the child associated with the child sub-account can access the vehicle and submit the delivery or pick-up the delivered item. In particular, at step 256, a child-friendly authentication interface is provided on the vehicle, on which the child can enter a pre-determined passcode. In some examples, interfaces for both the child-friendly authentication code and the primary user account authentication code are provided. In various examples, the child-friendly authentication interface is a non-alphanumeric authentication interface. As discussed in greater detail with respect to FIGS. 4A-4D, various non-alphanumeric authentication methods include emoji passcodes, building block arrangements, knocking sequences, complete-the-story codes, drawing recognition codes, favorite animated character selection, and bitmoji selection.

At step 258, an authentication code is received at the autonomous vehicle. In particular, a non-alphanumeric authentication code input through the child-friendly authentication interface is received. The received authentication code is compared to an authentication code selected in the user rideshare settings for the child sub-account, and, if the received authentication code matches the code in the child sub-account settings, at step 260, a vehicle door is unlocked, allowing the child to access the autonomous vehicle to retrieve the delivery and/or submit an item to be pick-up. In some examples, other verification methods are simultaneously enabled, such as receiving a unique identification signal from a child mobile device rideshare application.

In various implementations, since each child's passcode and account is connected to a primary user's account (e.g., a guardian's account), a primary user can be quickly notified and involved in the case when the passcode is entered incorrectly (which might signal an issue). In some examples, a primary user is notified after a child's passcode is entered incorrectly multiple times (e.g., two, three, or four times). In one example, the primary user receives a notification which, when tapped, opens a two-way video call from the primary user's phone to the authentication screen of the car to check on the situation and communicate with the child. In some implementations, a remote assistant can also be involved when a child is unable to access an autonomous vehicle. In particular, if a primary user is unable to help or does not respond to a notification, a remote assistant can be alerted to assess the situation and help the child.

In some implementations, certain passcodes are associated with children, and the autonomous vehicle automatically enters a child mode inside the vehicle. child mode can include one or more of adjusting the entertainment system to display child-friendly content, creating a robust connection to a primary user (e.g., guardian) through a two-way communication link (e.g., a walkie-talkie mode), live tracking of the autonomous vehicle, proactive alerts of any changes inside the vehicle cabin, and proactive alerts of any changes to the ride (e.g., slow down due to traffic). Additionally, since each passcode is associated with a particular child, a primary user can keep tabs on each child individually, thereby ensuring that each child is travelling safely, and has an appropriately personalized in-car experience. In some examples, each child has a child profile on a primary user's rideshare account, and personalized in-vehicle settings are specified in the child profile. In-vehicle settings can include one or more of entertainment options, HVAC (heating, ventilation, air conditioning) settings, communication link settings, and alert settings. In general, child mode can include tracking, personalization, and protective procedures. Additionally, when in child mode, direct fallback procedures can be automatically enabled, such as notifying a guardian of any ride changes and automatically enabling two-way communication.

In some implementations, instead of a ride request, the rideshare application receives a delivery request. For example, a user may arrange for the rideshare application to have an autonomous vehicle deliver an item to a selected location. At the delivery location, the user may choose to have a child pick up the item from the autonomous vehicle. The child-friendly authentication methods described herein can be used to allow the child to access the delivery items in the autonomous vehicle. That is, a child can use the child-friendly authentication interface to enter an authentication code and verify their identity, and the autonomous vehicle then allows the child to access an autonomous vehicle delivery compartment and retrieve the items.

Example Child-Friendly Authentication Interface

Figure 3:
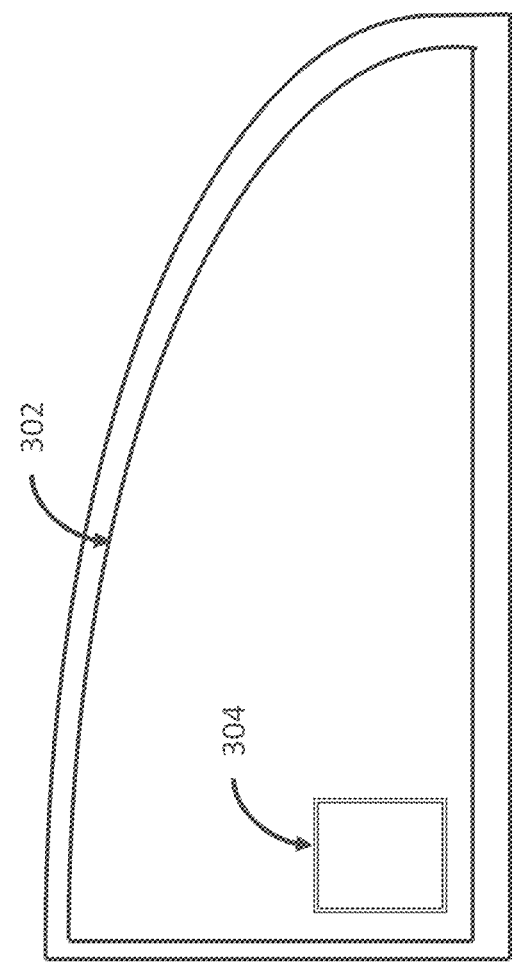
FIG. 3 is a diagram illustrating an autonomous vehicle window including an authentication interface, according to some embodiments of the disclosure.

FIG. 3 is a diagram 300 illustrating an autonomous vehicle window 302 including an authentication interface 304, according to various embodiments of the invention. According to various implementations, the authentication interface 304 can be situated in any window 302 of the autonomous vehicle, and in some examples, each window of the autonomous vehicle includes an authentication interface. Additionally, the authentication interface 304 can be positioned anywhere within an autonomous vehicle window 302, and in some examples, the placement of the authentication interface 304 can vary depending on the passenger. For instance, when the expected passenger is a child, the authentication interface 304 is configured to appear in a lower portion of the window 302 such that it is easier for the child to reach. Similarly, when the expected passenger is an adult, the authentication interface 304 can be configured to appear in an upper portion of the window 302. In some examples, the authentication interface 304 is in the autonomous vehicle door. When an accepted code is submitted through the authentication interface 304, the corresponding door (in which the authentication interface 304 is situated) is unlocked.

Figure 4B:
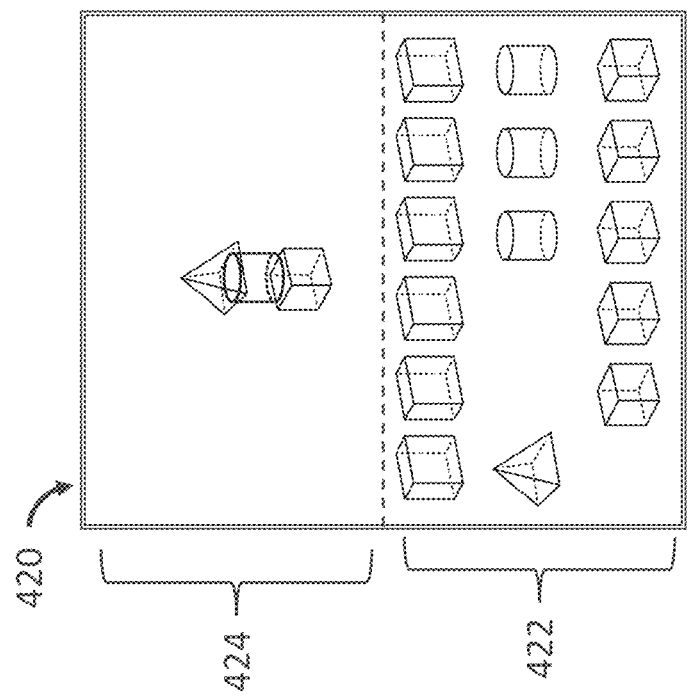
FIGS. 4A-4D are diagrams illustrating child-friendly authentication interfaces, according to some embodiments of the disclosure.
Figure 4A:
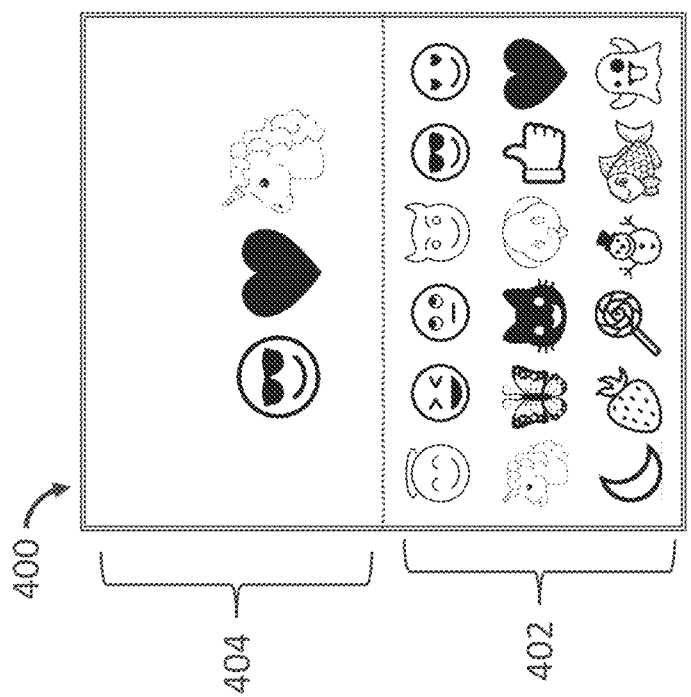

FIGS. 4A-4D are diagrams illustrating child-friendly authentication interfaces 400, 420, 440, 460 for autonomous vehicles, according to various embodiments of the invention. In particular, FIG. 4A illustrates a child-friendly authentication interface 400 configured for entering an emoji passcode, according to various embodiments of the invention. In various examples, when a child account is set up for unsupervised travel, the child (and/or guardian) can choose one or more emojis as the child's personal identifier. When the child is traveling unsupervised, or attempting to perform a protected action such as unlocking a delivery container, the authentication screen displays multiple emojis, and the child selects the correct one(s) for authentication and access to the vehicle. In FIG. 4A, the authentication screen displays various emojis in the bottom portion 402 of the screen. In various examples, different emojis are displayed on the screen. The screen is a touchscreen such that the child can touch the emoji or emojis corresponding to the child's passcode. When the child touches an emoji, it appears in the top portion of the screen, such that the top portion 404 of the screen displays the entered passcode. In FIG. 4A, the passcode includes a sequence of three emojis: a smiley face with sunglasses, a heart, and a unicorn. The child selects each of these emojis in the correct order to enter the passcode and gain access to the vehicle. In other examples, the child account is set up such that the sequence of the selected emojis is not a part of the passcode, and the child simply selects the correct set of emojis in any order.

FIG. 4B illustrates a child-friendly authentication interface 420 configured for entering a building block arrangement passcode, according to various embodiments of the invention. In this example, a virtual set of building blocks is available in the bottom portion 422 of the authentication interface 420, and the child can drag and drop any of the blocks into a specific structure. The building block structure corresponding to the passcode is defined during setup of the child account. In the example shown in FIG. 4B, there are four different block types, and the child chooses the appropriate block and drags it to the top portion 424 of the authentication interface 420 to build the structure corresponding to the passcode. In another example, out of three different block types, the goal structure uses the first two to create an alternating tower of four blocks. One the building block structure in the top portion 424 of the authentication interface has been built, the passcode is authenticated and the child is permitted access to the vehicle.

Figure 4D:
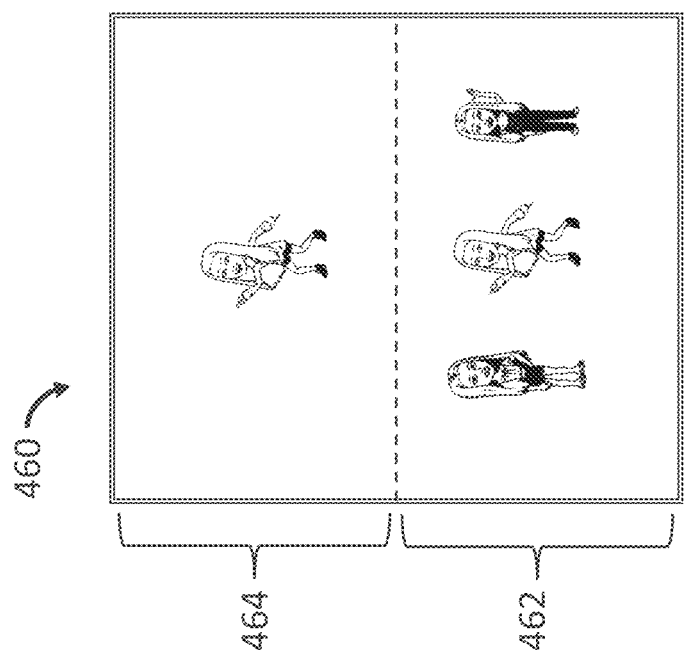
Figure 4C:
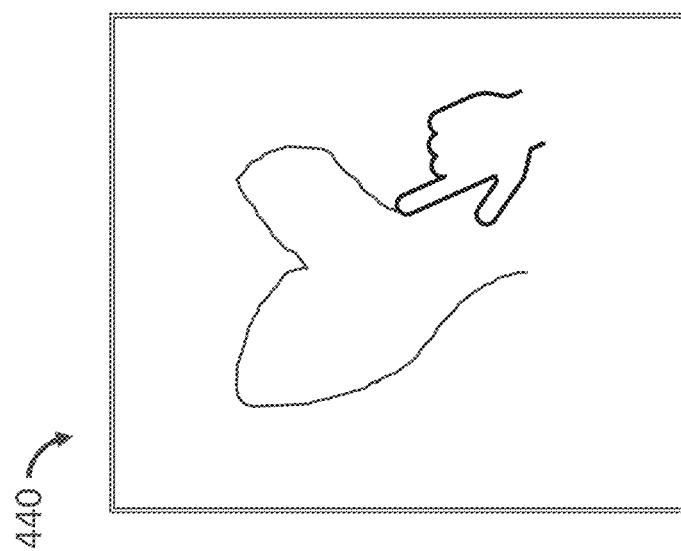

FIG. 4C illustrates a child-friendly authentication interface 440 configured for entering a drawing recognition passcode, according to various embodiments of the invention. As shown in the interface 440, a child can draw a simple image on the touchscreen as a passcode. For example, the passcode can be the outline of a heart. In other examples, the passcode is a star, a smiley face, a diamond, a hand shape, a moon, a sun, a stick figure, or some other easy-to-draw image. The autonomous vehicle can use a machine learning algorithm to identify the hand-drawn image and determine whether the passcode was correctly entered.

FIG. 4D illustrates a child-friendly authentication interface 460 configured for entering a bitmoji and/or memoji passcode, according to various embodiments of the invention. In particular, in some examples, a child can create a self-based avatar matching physical traits, selected dressing styles, and other elements of the child's personality. The self-based avatar can be a unique representation of the child's self to others. In some examples, various forms of the avatar are displayed as bitmojis on the bottom portion 462 of the authentication interface 460, and the child selects the correct bitmoji or bitmojis. In the example shown in FIG. 4D, there are three bitmojis, each having a different position and different clothing, and the child chooses the appropriate bitmoji and drags it to the top portion 464 of the authentication interface 460. When the selected bitmoji entered in the top portion 464 matches the passcode, the user is authenticated. In other examples, the bitmojis displayed in the bottom portion 462 of the authentication interface 460 can have different hairstyles, faces, or other features. In one example, the bitmojis are all the same except for the clothing on the bitmoji, and the child selects the bitmoji with the correct clothing. In some examples, the child selects a sequence of bitmojis.

In some examples, the child-friendly authentication interface is configured for selecting an animated character and/or animated character sequence. When setting up a child sub-account, the child can choose one or more favorite animated characters from popular kids movies and tv shows. To successfully authenticate when interacting with the autonomous vehicle the child picks from a grid of animated characters to form the unlock sequence.

In another example, the authentication passcode is a knocking sequence. In particular, a selected knocking sequence is set as the authentication code in the child account. In various examples, the knocking sequence can be a selected rhythm. The child performs the knocking sequence in the authentication window, and the knocking sequence is a passcode that unlocks the autonomous vehicle.

In some implementations, the authentication passcode includes a story sequence. The story sequence is set as the authentication code in the child account. In some examples, the story sequence is a series of image frames that tell a simple story. Two image frame options are presented at each stage of the story, and the passcode is the selection of the correct image frames at each stage. The story may include three, four, or five image frames. When the child selects the correct image frames, the passcode unlocks the autonomous vehicle.

In various examples, child-friendly authentication is used for various types of passengers. For instance, child-friendly authentication can be used for any passenger who prefers non-alphanumeric codes. Some examples include passengers who have difficulty learning to read and/or write, passengers with special needs, and passengers who learned to read and/or write in a language with non-alphanumeric characters.

In some implementations, when the child-friendly authentication code is received, the autonomous vehicle adjusts in-vehicle settings to child mode settings. In some examples, child mode settings are entered in a child sub-account in the primary user's account. Additionally, in various implementations, child-friendly authentication can be used to access features inside the vehicle. For example, if food, beverages, or other items are available in locked compartments within the vehicle, the authentication code can be used to access the compartments with these items.

Example of a Mobile Device Child Ride Request Interface

Figures 5A, 5B:
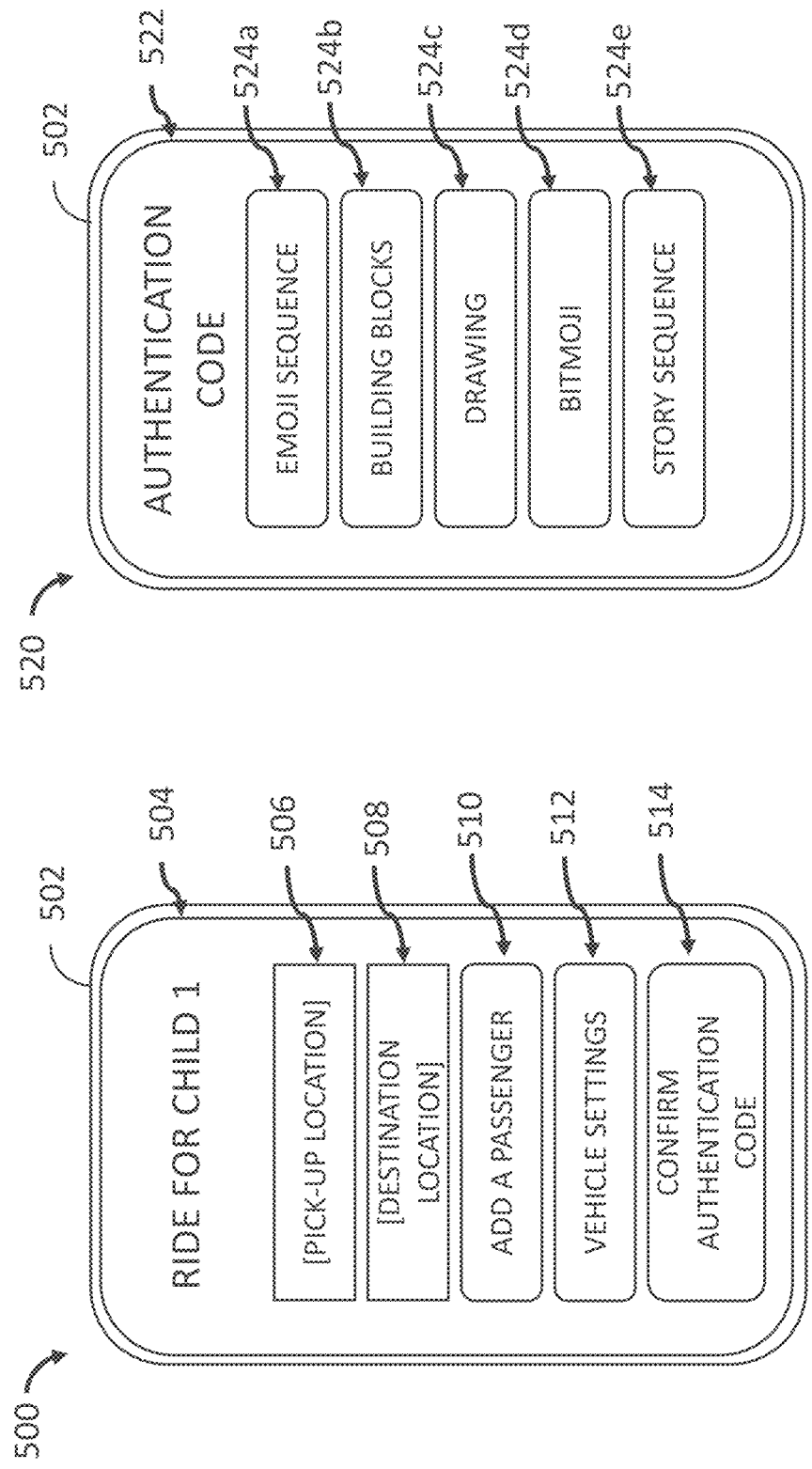
FIGS. 5A-5B show examples of an interface for a child rideshare account, according to some embodiments of the disclosure.

FIGS. 5A-5B show examples 500, 520, of an interface for requesting a child ride, according to some embodiments of the disclosure. FIG. 5A shows an example 500 of a device 502 showing a rideshare application interface 504 for requesting a ride for a child. In particular, when a user orders a ride for a child in a rideshare application, the user interface 504 is displayed, prompting the user to enter a pick-up location 506 and a destination location 508. The user has the option of adding a passenger to the rider by selecting the button 510. The user has the option of changing the child mode vehicle settings by selecting the button 512. Additionally, the user can confirm the child authentication code by selecting the button 514. If an authentication code has already been set, when the button 514 is selected, the current authentication code is displayed.

FIG. 5B shows an example 520 of an interface 522 for setting an authentication code. The user can choose which type of authentication code to set for the child account. The first button 524a can be used to set an emoji sequence authentication code, as discussed above with respect to FIG. 4A. Selecting the first button 524a leads to another interface with a selection of emojis which can be used to set an emoji sequence authentication code. The second button 524b can be used to set a building block authentication code, as discussed above with respect to FIG. 4B. Selecting the second button 524b leads to another interface with a selection of building blocks which can be used to set a building block authentication code. The third button 524c can be used to set a drawing authentication code. Selecting the third button 524c leads to another interface with a blank screen for creating a drawing for use as the authentication code. The fourth button 524d can be used to set a bitmoji authentication code. Selecting the fourth button 524d leads to another interface through which a user's bitmoji or bitmojis can be uploaded for use as the authentication code. The fifth button 524e can be used to set a story sequence authentication code. Selecting the fifth button 524e leads to another interface through which a user can select a story sequence for use as the authentication code. In some examples, a child account includes multiple authentication codes.

Example of Central Computing System and Autonomous Vehicle

Figure 6:
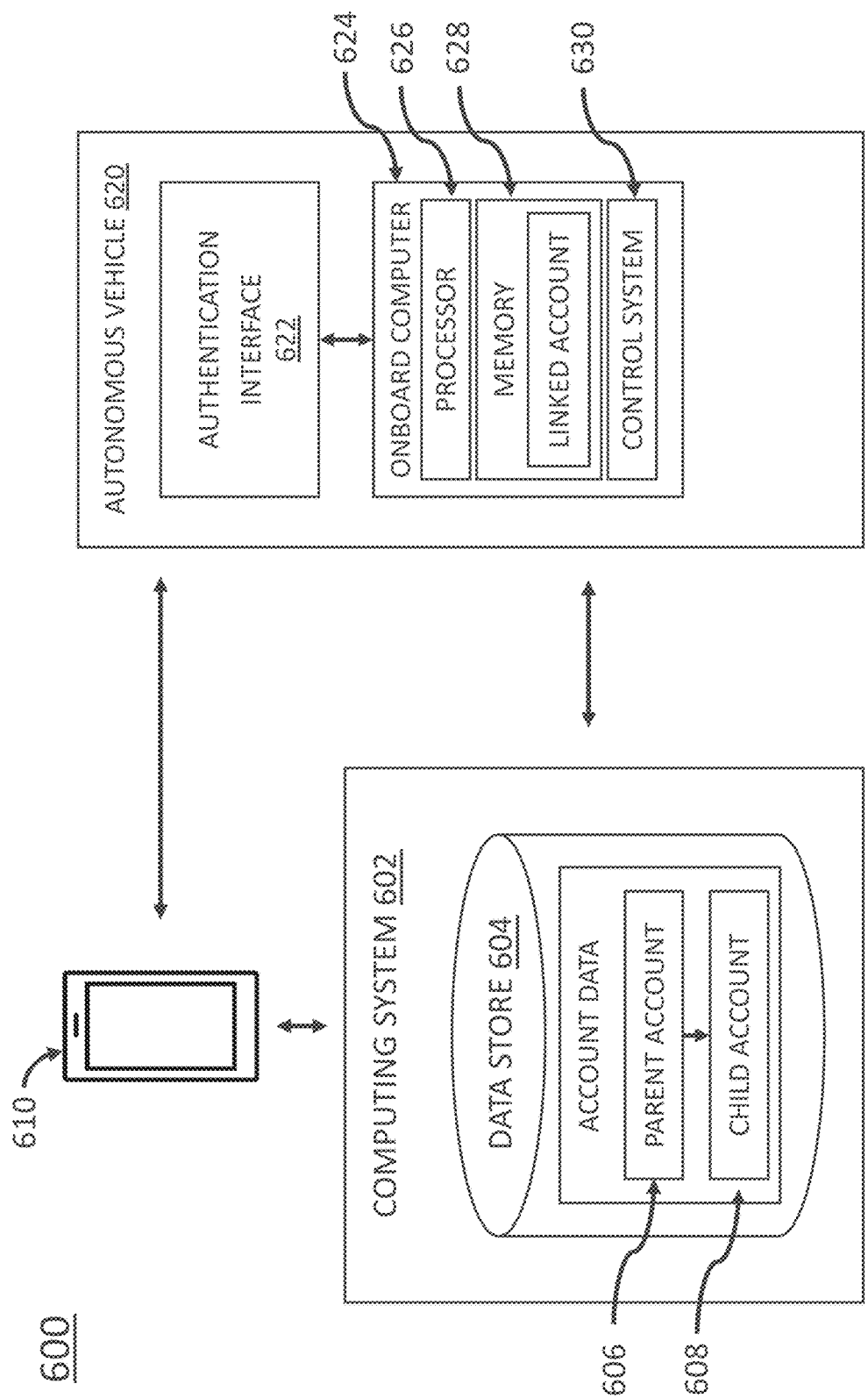
FIG. 6 is a diagram illustrating a central computing system 602 in communication with an autonomous vehicle 620 and a mobile device 610, according to some embodiments of the disclosure.

FIG. 6 is a diagram illustrating a central computing system 602 in communication with an autonomous vehicle 620 and a mobile device 610, according to various embodiments of the disclosure. The central computing system 602 includes a database 604 with rideshare user account data. The rideshare user account data includes a primary guardian account 606 and an associated child sub-account 608. The central computing system 602 can send and receive data from both the mobile device 610 and the autonomous vehicle 620. Similarly, the mobile device 610 is configured to transmit and/or receive data from the central computing system 602 and/or the autonomous vehicle 620. Thus, the mobile device 610 can be in communication with the central computing system 610. The mobile device 610 can also be in direct communication with the autonomous vehicle 620. In some implementations, once an autonomous vehicle is assigned for the ride request and is en route to the pick-up location, the autonomous vehicle 620 is in direct communication with the mobile device 610.

The autonomous vehicle 620 includes an authentication interface 622 and an onboard computer 624. In some examples, the authentication interface 622 is a touchscreen on the autonomous vehicle 620. In some examples, the authentication interface 622 appears in the autonomous vehicle window. The onboard computer includes a processor 626, a memory 628, and a control system 630. The autonomous vehicle receives user account information associated with the ride request received from the central computing system 602, and the onboard computer 624 stores the user account information in the memory 628. The user account information includes the guardian account 606 and any associated sub-accounts, such as the child account 608.

In some implementations, the child account 608 includes a non-alphanumeric authentication code. When the primary account holder, from the guardian account, orders an unsupervised ride for a child, the child can input the non-alphanumeric authentication code to the authentication interface 622 on the autonomous vehicle 620. When the non-alphanumeric authentication code is received through the authentication interface 622, the onboard computer 624 causes an autonomous vehicle door to be unlocked, thereby allowing the passenger to gain access to the autonomous vehicle 620. In some examples, the primary account holder submits a ride request without indicating that it is an unsupervised ride for the child. When the child arrives at the autonomous vehicle and enters the child account non-alphanumeric authentication code, the autonomous vehicle identifies the passenger as the child and adjusts in-vehicle settings to child mode settings associated with the child account 608. In some implementations, when the autonomous vehicle picks up a child passenger, the autonomous vehicle 620 is in direct communication with a guardian account mobile device, such as the mobile device 610. In some examples, a two-way communication link is set up between the autonomous vehicle 620 and the guardian account mobile device.

In some implementations, trip information is continuously shared with a guardian mobile device during a ride. Trip information can include one or more of autonomous vehicle current location, anticipated time of arrival at the pick-up location, anticipated time of arrival at the drop-off location, license plate of the autonomous vehicle, make and/or model of the autonomous vehicle, cabin temperature of the autonomous vehicle, currently playing entertainment in the autonomous vehicle, livestream video of the autonomous vehicle cabin, and livestream audio from the autonomous vehicle cabin.

Example of Autonomous Vehicle Fleet

Figure 7:
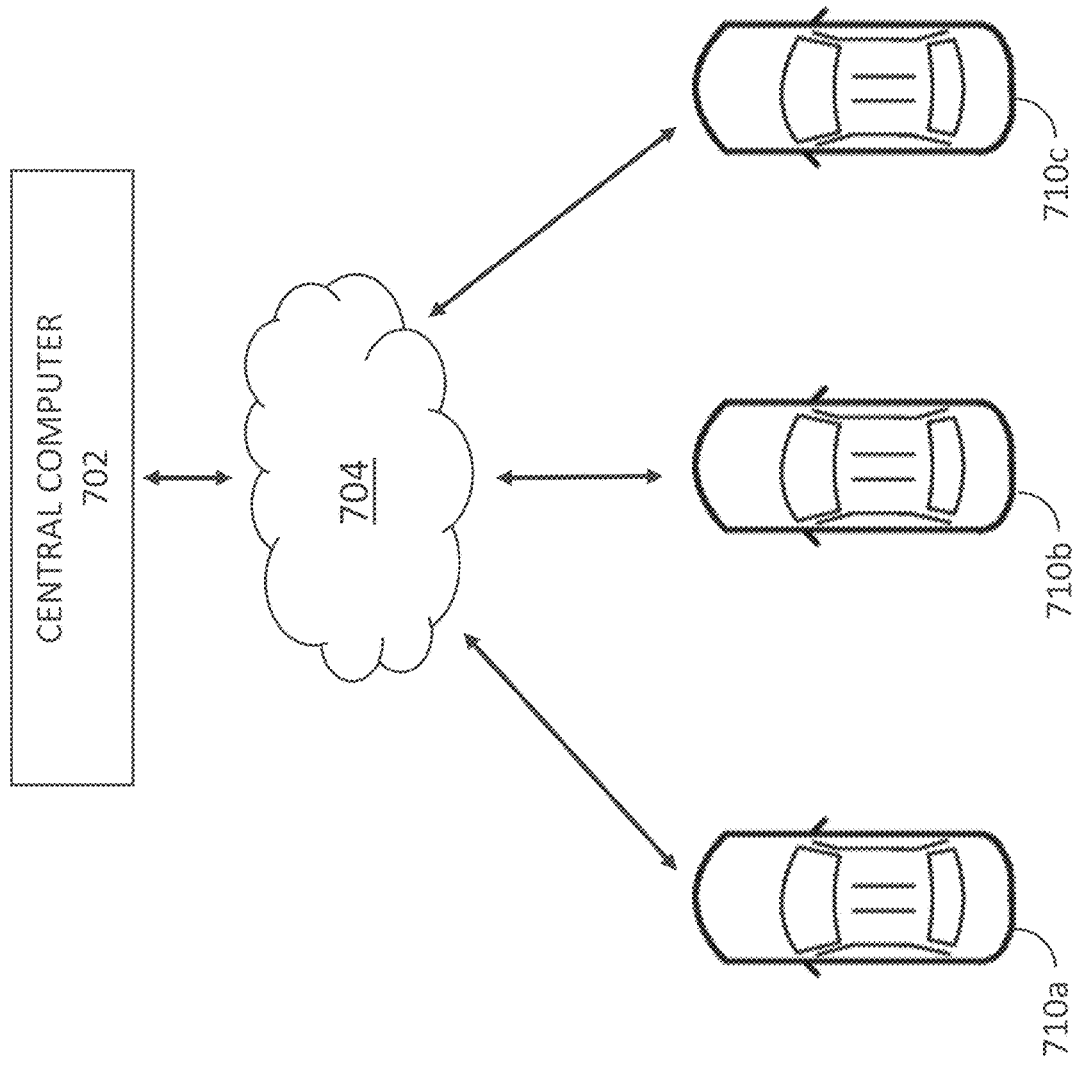
FIG. 7 is a diagram illustrating a fleet of autonomous vehicles in communication with a central computer, according to some embodiments of the disclosure.

FIG. 7 is a diagram illustrating a fleet of autonomous vehicles 710a-710c in communication with a central computer 702, according to some embodiments of the disclosure. As shown in FIG. 7, the vehicles 710a-710c communicate wirelessly with a cloud 704 and a central computer 702. The central computer 702 includes a routing coordinator and a database of information from the vehicles 710a-710c in the fleet. Autonomous vehicle fleet routing refers to the routing of multiple vehicles in a fleet. In some implementations, autonomous vehicles communicate directly with each other.

When a ride request is received from a passenger, the routing coordinator selects an autonomous vehicle 710a-710c to fulfill the ride request, and generates a route for the autonomous vehicle 710a-710c. The generated route includes a route from the autonomous vehicle's present location to the pick-up location, and a route from the pick-up location to the final destination. In some examples, the ride request includes a child mode ride request.

Each vehicle 710a-710c in the fleet of vehicles communicates with a routing coordinator. Information gathered by various autonomous vehicles 710a-710c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals.

In various examples, the data collected by the routing coordinator is used to determine autonomous vehicle routing during a stopping interval. Additionally, data collected by the routing coordinator is used to determine autonomous vehicle fleet efficiency when allowing a user to reserve the autonomous vehicle for exclusive use during a stopping interval. In some examples, the fee charged for exclusive use of an autonomous vehicle during a stopping interval is correlated with fleet efficiency. In particular, pricing can be adjusted dynamically to encourage passengers to select the more efficient option. For example, the greater the negative impact of exclusive use of a specific autonomous vehicle on overall fleet efficiency, the higher the cost of the exclusive use option. Thus, in some examples, the exclusive use option is more expensive during a busy time period and less expensive during a slow time period.

According to various implementations, a set of parameters can be established that determine which metrics are considered (and to what extent) in determining routes or route modifications. In some examples, the route includes autonomous vehicle routing during a supervised stopping interval, as described in greater detail with respect to FIG. 4. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints. In another example, a routing goal includes on time pick up of a passenger at the end of a supervised stop.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to al vehicles of a specific type, etc. Routing goad timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination and/or any supervised stop. Similarly, in some examples, during a supervised stop, the onboard computer determines whether the autonomous vehicle parks or continues to drive and circles back to the pick-up location. In some implementations, the routing coordinator in the central computing system 702 generates a route for each selected autonomous vehicle 710a-710c, and the routing coordinator determines a route for the autonomous vehicle 710a-710c to travel from the autonomous vehicle's current location to a first intermediate stop.

Example of a Computing System for Ride Requests

Figure 8:
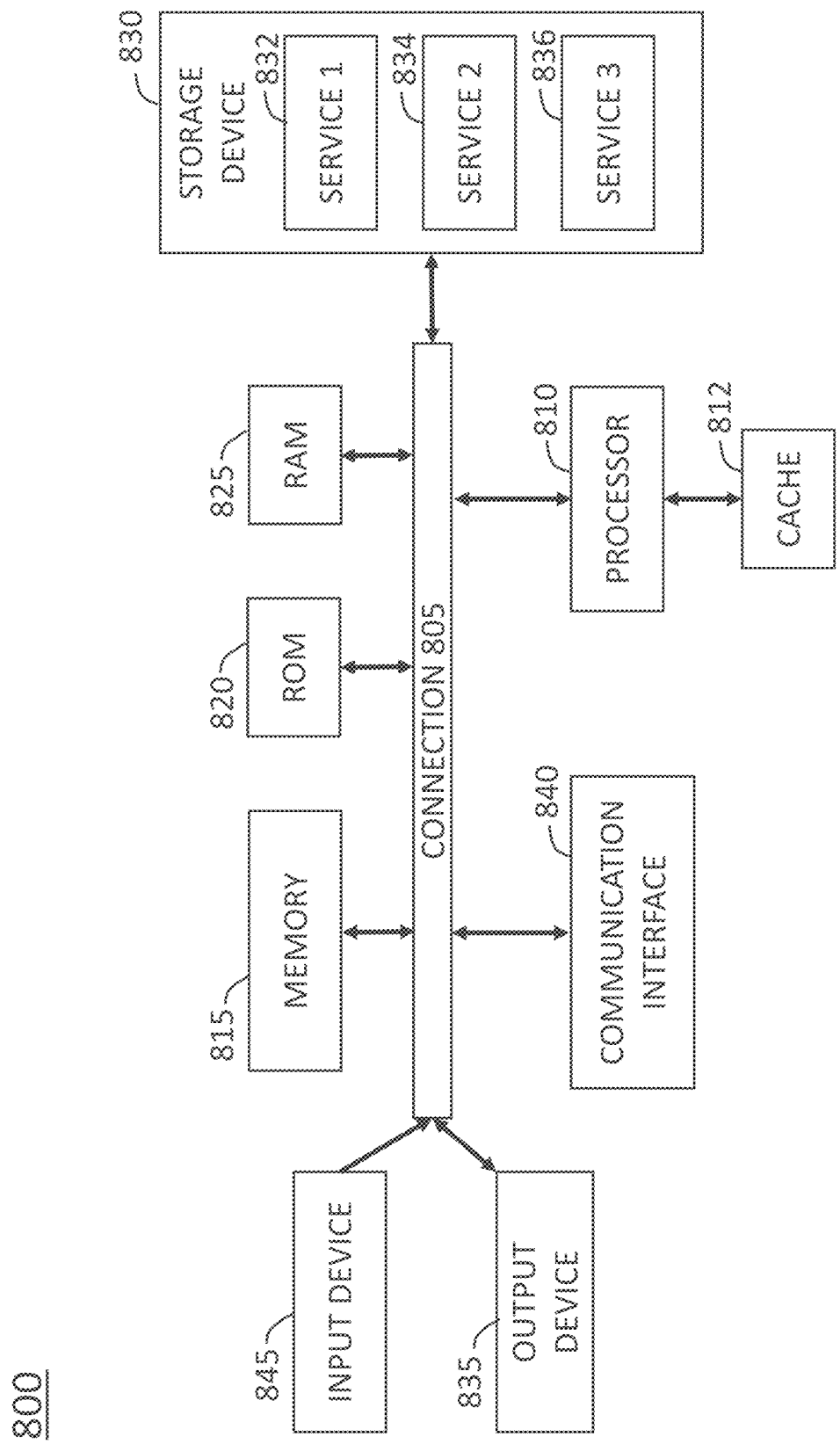
FIG. 8 shows an example embodiment of a system for implementing certain aspects of the present technology.

FIG. 8 shows an example embodiment of a computing system 800 for implementing certain aspects of the present technology. In various examples, the computing system 800 can be any computing device making up the onboard computer 104, the central computing system 702, or any other computing system described herein. The computing system 800 can include any component of a computing system described herein which the components of the system are in communication with each other using connection 805. The connection 805 can be a physical connection via a bus, or a direct connection into processor 810, such as in a chipset architecture. The connection 805 can also be a virtual connection, networked connection, or logical connection.

In some implementations, the computing system 800 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 800 includes at least one processing unit (CPU or processor) 810 and a connection 805 that couples various system components including system memory 815, such as read-only memory (ROM) 820 and random access memory (RAM) 825 to processor 810. The computing system 800 can include a cache of high-speed memory 812 connected directly with, in close proximity to, or integrated as part of the processor 810.

The processor 810 can include any general-purpose processor and a hardware service or software service, such as services 832, 834, and 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction, the computing system 800 includes an input device 845, which can represent any number of input mechanisms, such as a microphone for speech, a touch-sensitive screen for gesture or graphical input, keyboard, mouse, motion input, speech, etc. The computing system 800 can also include an output device 835, which can be one or more of a number of output mechanisms known to those of skill in the art. In some instances, multimodal systems can enable a user to provide multiple types of input/output to communicate with the computing system 800. The computing system 800 can include a communications interface 840, which can generally govern and manage the user input and system output. There is no restriction on operating on any particular hardware arrangement, and therefore the basic features here may easily be substituted for improved hardware or firmware arrangements as they are developed.

A storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as a processor 810, a connection 805, an output device 835, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a method for child friendly authentication in an autonomous vehicle, comprising receiving a ride request including a pick-up location from a primary user account; receiving a non-alphanumeric authentication code from the primary user account; transmitting the ride request including the authentication code to the autonomous vehicle; presenting, at the pick-up location, an authentication interface configured to receive an authentication input; comparing the authentication input with the authentication code.

Example 2 provides a method according to one or more of the preceding and/or following examples, wherein the primary user account includes a child sub-account and wherein receiving the non-alphanumeric authentication code includes associating the non-alphanumeric authentication code with the child sub-account.

Example 3 provides a method according to one or more of the preceding and/or following examples, further comprising determining the ride request is associated with the child sub-account based on the authentication input.

Example 4 provides a method according to one or more of the preceding and/or following examples, further comprising entering the autonomous vehicle into a child mode based on child sub-account settings.

Example 5 provides a method according to one or more of the preceding and/or following examples, further comprising, when the authentication input and the authentication code do not match, contacting a primary user account mobile device.

Example 6 provides a method according to one or more of the preceding and/or following examples, further comprising receiving the authentication input from one of a mobile device and an autonomous vehicle touchscreen.

Example 7 provides a method according to one or more of the preceding and/or following examples, wherein the authentication code includes at least one of an emoji, a bitmoji, a memoji, an animated character, a building block arrangement, a knocking pattern, a drawing, and a story frame sequence.

Example 8 provides a method according to one or more of the preceding and/or following examples, further comprising, when the authentication input and the authentication code do not match, contacting a live remote assistant.

Example 9 provides a system for child friendly authentication an autonomous vehicle, comprising: a central computing system configured to: receive a ride request from a primary user account including a pick-up location, wherein the primary user account includes a non-alphanumeric authentication code; select an autonomous vehicle to fulfill the ride request; and transmit the ride request and the non-alphanumeric authentication code to the autonomous vehicle; an authentication interface on the autonomous vehicle configured to receive an authentication input; and an onboard computing system on the autonomous vehicle configured to: direct the autonomous vehicle to the pick-up location; present the authentication interface; compare the authentication input with the authentication code; and based on the comparison, unlock an autonomous vehicle door.

Example 10 provides a system according to one or more of the preceding and/or following examples, wherein the primary user account includes a child sub-account and wherein the non-alphanumeric authentication code is associated with the child sub-account.

Example 11 provides a system according to one or more of the preceding and/or following examples, wherein the onboard computing system is further configured to determine the ride request is associated with the child sub-account based on the authentication input.

Example 12 provides a system according to one or more of the preceding and/or following examples, wherein the onboard computing system is further configured to enter the autonomous vehicle into a child mode based on child sub-account settings.

Example 13 provides a system according to one or more of the preceding and/or following examples, wherein when the authentication input and the authentication code do not match, the onboard computing system is further configured to contact a primary user account mobile device.

Example 14 provides a system according to one or more of the preceding and/or following examples, wherein the authentication code includes at least one of an emoji, a bitmoji, a memoji, an animated character, a building block arrangement, a knocking pattern, a drawing, and a story frame sequence.

Example 15 provides a system according to one or more of the preceding and/or following examples, wherein the onboard computing system is further configured to determine the ride request is associated with a child sub-account and the authentication interface provides a selection of input characters corresponding with an authentication code type.

Example 16 provides an autonomous vehicle for providing child friendly authentication, comprising: an authentication interface configured to receive a non-alphanumeric authentication input; and an onboard computing system configured to: receive ride request information including a pick-up location and a non-alphanumeric authentication code, wherein the ride request information is associated with a primary user account, and wherein the primary user account includes a child sub-account and the non-alphanumeric authentication code is associated with the child sub-account; direct the autonomous vehicle to the pick-up location; present the authentication interface; compare the authentication input with the authentication code; and based on the comparison, unlock an autonomous vehicle door.

Example 17 provides an autonomous vehicle according to one or more of the preceding and/or following examples, wherein the onboard computing system is further configured to determine the ride request is associated with the child sub-account based on the authentication input.

Example 18 provides an autonomous vehicle according to one or more of the preceding and/or following examples, wherein the onboard computing system is further configured to enter the autonomous vehicle into a child mode based on child sub-account settings.

Example 19 provides an autonomous vehicle according to one or more of the preceding and/or following examples, wherein the onboard computing system is further configured to determine the ride request is associated with a child sub-account and the authentication interface provides a selection of input characters corresponding with an authentication code type.

Example 20 provides an autonomous vehicle according to one or more of the preceding and/or following examples, wherein the authentication code includes at least one of an emoji, a bitmoji, a memoji, an animated character, a building block arrangement, a knocking pattern, a drawing, and a story frame sequence.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for child friendly authentication in an autonomous vehicle, comprising:
   receiving a ride request including a pick-up location from a primary user account, wherein the primary user account includes a child sub-account;
   receiving a non-alphanumeric authentication code from the primary user account;
   transmitting the ride request including the authentication code to the autonomous vehicle;
   determining the ride request is associated with the child sub-account based on the authentication input;
   entering the autonomous vehicle into a child mode based on child sub-account settings;
   directing the autonomous vehicle to the pick-up location;
   presenting, at the pick-up location, an authentication interface configured to receive an authentication input;
   comparing the authentication input with the authentication code, determining the authentication input matches the authentication code; and
   unlocking an autonomous vehicle door.

2. The method of claim 1, wherein receiving the non-alphanumeric authentication code includes associating the non-alphanumeric authentication code with the child sub-account.

3. The method of claim 2, further comprising, when the authentication input and the authentication code do not match, contacting a mobile device associated with the primary user account.

4. The method of claim 1, further comprising receiving the authentication input from one of a mobile device and an autonomous vehicle touchscreen.

5. The method of claim 1, wherein the authentication code includes at least one of an emoji, a bitmoji, a memoji, an animated character, a building block arrangement, a knocking pattern, a drawing, and a story frame sequence.

6. The method of claim 1, further comprising, when the authentication input and the authentication code do not match, contacting a live remote assistant.

7. A system for child friendly authentication in an autonomous vehicle, comprising:
   a central computing system having at least one first hardware processor configured to:
   receive a ride request from a primary user account including a pick-up location, wherein the primary user account includes a child sub-account;
   receive a non-alphanumeric authentication code from the primary user account;
   select an autonomous vehicle to fulfill the ride request; and
   transmit the ride request and the non-alphanumeric authentication code to the autonomous vehicle;
   an authentication interface on the autonomous vehicle configured to receive an authentication input; and
   an onboard computing system on the autonomous vehicle having at least one second hardware processor configured to:
   determine the ride request is associated with the child sub-account based on the authentication input;
   enter the autonomous vehicle into a child mode based on child sub-account settings;
   direct the autonomous vehicle to the pick-up location;
   present the authentication interface;
   compare the authentication input with the authentication code; and
   based on the comparison, unlock an autonomous vehicle door.

8. The system of claim 7, wherein the non-alphanumeric authentication code is associated with the child sub-account.

9. The system of claim 8, wherein when the authentication input and the authentication code do not match, the onboard computing system is further configured to contact a mobile device associated with the primary user account.

10. The system of claim 7, wherein the authentication code includes at least one of an emoji, a bitmoji, a memoji, an animated character, a building block arrangement, a knocking pattern, a drawing, and a story frame sequence.

11. The system of claim 10, wherein the onboard computing system is further configured to determine the ride request is associated with a child sub-account and the authentication interface provides a selection of input characters corresponding with an authentication code type.

12. The system of claim 7, wherein the onboard computing system is further configured to contact a live remote assistant when the authentication input and the authentication code do not match.

13. The system of claim 7, wherein the non-alphanumeric authentication code is stored in settings for the child sub-account.

14. The system of claim 7, wherein the onboard computing system is further configured to determine the authentication input matches the authentication code, and provide access to in-vehicle compartments.

15. An autonomous vehicle for providing child friendly authentication, comprising:
   an authentication interface configured to receive a non-alphanumeric authentication input; and
   an onboard computing system having at least one first hardware processor configured to:
   receive ride request information including a pick-up location and a non-alphanumeric authentication code, wherein the ride request information is associated with a primary user account, and wherein the primary user account includes a child sub-account and the non-alphanumeric authentication code is associated with the child sub-account;
   determine the ride request is associated with the child sub-account based on the authentication input;
   enter the autonomous vehicle into a child mode based on child sub-account settings;
   direct the autonomous vehicle to the pick-up location;
   present the authentication interface;
   compare the authentication input with the authentication code; and
   based on the comparison, unlock an autonomous vehicle door.

16. The autonomous vehicle of claim 15, wherein the onboard computing system is further configured to determine the ride request is associated with a child sub-account and the authentication interface provides a selection of input characters corresponding with an authentication code type.

17. The autonomous vehicle of claim 15, wherein the authentication code includes at least one of an emoji, a bitmoji, a memoji, an animated character, a building block arrangement, a knocking pattern, a drawing, and a story frame sequence.

18. The autonomous vehicle of claim 15, wherein the onboard computing system is further configured to contact a live remote assistant when the authentication input and the authentication code do not match.

19. The autonomous vehicle of claim 15, wherein the non-alphanumeric authentication code is stored in settings for the child sub-account.

20. The autonomous vehicle of claim 15, wherein the onboard computing system is further configured to determine the authentication input matches the authentication code, and provide access to in-vehicle compartments.

* * * * *